(12) United States Patent
Gideonse, XIX et al.

(10) Patent No.: US 8,861,185 B2
(45) Date of Patent: Oct. 14, 2014

(54) MEDIA PLAYER AND PERIPHERAL DEVICES THEREFORE

(76) Inventors: Hendrik David Gideonse, XIX, Medford, MA (US); Connor K Smith, Hinckley, OH (US)

( * ) Notice: Subject to any disclaimer, the term of this patent is extended or adjusted under 35 U.S.C. 154(b) by 191 days.

(21) Appl. No.: 12/851,383

(22) Filed: Aug. 5, 2010

(65) Prior Publication Data

US 2011/0032666 A1 Feb. 10, 2011

Related U.S. Application Data

(60) Provisional application No. 61/231,572, filed on Aug. 5, 2009.

(51) Int. Cl.
*G06F 3/02* (2006.01)
*G06F 3/0485* (2013.01)
*G06F 1/16* (2006.01)
*G06F 3/0354* (2013.01)

(52) U.S. Cl.
CPC ...... *G06F 3/0485* (2013.01); *G06F 2203/0339* (2013.01); *G06F 2203/0333* (2013.01); *G06F 1/1626* (2013.01); *G06F 1/1632* (2013.01); *G06F 3/03547* (2013.01)
USPC ..................................... 361/679.01; 345/168

(58) Field of Classification Search
CPC ....... G06F 1/16; G06F 1/181; G06F 3/04845; G06F 3/0485; G06F 21/83; G06F 2203/0331; G06F 2203/0333; G06F 3/02; H05K 5/023
USPC ............. 361/679.01, 679.02, 679.21, 679.22, 361/679.26, 679.56, 679.58; 455/575.1–575.4; 379/433.11–433.13; 345/168–172; 341/22–33; 400/474–496
See application file for complete search history.

(56) References Cited

U.S. PATENT DOCUMENTS

| | | | |
|---|---|---|---|
| 5,332,322 A * | 7/1994 | Gambaro | 400/489 |
| 6,107,992 A | 8/2000 | Ishigaki | |
| 6,177,926 B1 | 1/2001 | Kunert | |
| D440,977 S | 4/2001 | Weisz et al. | |
| 6,253,982 B1 | 7/2001 | Gerardi | |
| 6,256,011 B1 | 7/2001 | Culver | |
| 6,297,795 B1 | 10/2001 | Kato et al. | |
| D460,971 S | 7/2002 | Sica et al. | |
| D495,336 S | 8/2004 | Andre et al. | |
| 6,925,315 B2 * | 8/2005 | Langford | 455/575.1 |
| D513,265 S | 12/2005 | Chan | |
| 7,073,063 B2 | 7/2006 | Peinado | |
| D529,512 S | 10/2006 | Reawsanguanwong | |
| 7,151,527 B2 | 12/2006 | Culver | |
| 7,171,018 B2 | 1/2007 | Rhoads et al. | |
| D538,821 S | 3/2007 | Bender | |
| 7,231,669 B2 | 6/2007 | Leung et al. | |
| D546,839 S | 7/2007 | Hynecek et al. | |

(Continued)

*Primary Examiner* — Anthony Haughton
*Assistant Examiner* — Ingrid Wright
(74) *Attorney, Agent, or Firm* — ATIP Law (57) ABSTRACT

A media player is provided with a lateral groove across the back of the housing of the media player that receives a user's forefinger and provides an ergonomic grip for the media player. A control button, including thumb operated button zones and a thumb operated slider zone is located on a front face of the housing. When the user grips the media player with their forefinger located in the lateral groove, the user's thumb is naturally adjacent the button zones and slider zone. A docking station for the media player that fits within a cup holder of a motor vehicle is also described.

11 Claims, 9 Drawing Sheets

(56) References Cited

U.S. PATENT DOCUMENTS

| | | |
|---|---|---|
| D547,738 S | 7/2007 | Liang et al. |
| D551,255 S | 9/2007 | Chikuma et al. |
| 7,345,671 B2 | 3/2008 | Robbin et al. |
| D572,702 S | 7/2008 | Bart |
| D575,274 S | 8/2008 | Donovan et al. |
| D576,999 S | 9/2008 | Tofflinger |
| 7,421,656 B2 | 9/2008 | Fong et al. |
| D584,732 S | 1/2009 | Cho et al. |
| D592,637 S | 5/2009 | Zhang |
| D593,066 S | 5/2009 | Sheba et al. |
| D593,535 S | 6/2009 | Sheba et al. |
| D593,560 S | 6/2009 | Leung et al. |
| D597,523 S | 8/2009 | Zhang et al. |
| 7,577,999 B2 | 8/2009 | Narin et al. |
| 7,931,505 B2 * | 4/2011 | Howard et al. ............... 439/680 |
| 2003/0149668 A1 | 8/2003 | Lee et al. |
| 2003/0195855 A1 | 10/2003 | Parks et al. |
| 2004/0163272 A1 * | 8/2004 | Knight ............................ 33/767 |
| 2004/0211601 A1 | 10/2004 | Allan |
| 2005/0210101 A1 | 9/2005 | Janik |
| 2005/0219208 A1 * | 10/2005 | Eichenberger et al. ........ 345/157 |
| 2006/0033714 A1 * | 2/2006 | Boldin ........................... 345/163 |
| 2006/0077067 A1 * | 4/2006 | Chong et al. ................ 340/815.4 |
| 2006/0190410 A1 | 8/2006 | Harper |
| 2006/0227066 A1 | 10/2006 | Hu et al. |
| 2007/0137463 A1 | 6/2007 | Lumsden |
| 2007/0276866 A1 | 11/2007 | Bodin et al. |
| 2007/0283381 A1 | 12/2007 | Sidi et al. |
| 2008/0019082 A1 | 1/2008 | Krieger et al. |
| 2008/0062141 A1 | 3/2008 | Chandhri |
| 2008/0084399 A1 * | 4/2008 | Chua et al. .................... 345/173 |
| 2008/0106518 A1 | 5/2008 | Orlassino |
| 2008/0155129 A1 | 6/2008 | Knedouri et al. |
| 2008/0180401 A1 | 7/2008 | Knedouri et al. |
| 2008/0187115 A1 | 8/2008 | Knedouri et al. |
| 2008/0202823 A1 | 8/2008 | Won et al. |
| 2008/0212945 A1 | 9/2008 | Knedouri et al. |
| 2008/0248834 A1 | 10/2008 | Chatterjee et al. |
| 2009/0015568 A1 * | 1/2009 | Koski ............................ 345/184 |
| 2009/0160825 A1 * | 6/2009 | Payne ........................... 345/179 |
| 2009/0177742 A1 | 7/2009 | Rhoades et al. |
| 2009/0177968 A1 | 7/2009 | Volk |
| 2010/0035665 A1 * | 2/2010 | Munson ...................... 455/575.1 |

\* cited by examiner

MEDIA PLAYER AND PERIPHERAL DEVICES THEREFORE

CROSS REFERENCE TO RELATED APPLICATIONS

This application claims priority to U.S. provisional patent application Ser. No. 61/231,572, filed Aug. 5, 2010, the contents of which is herein incorporated by reference.

FIELD OF THE INVENTION

The present invention relates to media players and to software for interfacing with media players that play media files of a variety of formats.

BACKGROUND

Modern media players are generally designed to be thin, sleek and aesthetically pleasing. Unfortunately, the requirement for a thin profile ignores ergonomic requirements of the media player and can make the media player difficult to operate. What is required, is a control interface that may be combined with other ergonomic elements of a media player to provide a more comfortable to use device.

What is further required is a media player that can be quickly and conveniently located to within a motor vehicle and to be relocated to a home entertainment system.

SUMMARY OF ONE EMBODIMENT OF THE INVENTION

Advantages of One or More Embodiments of the Present Invention

The various embodiments of the present invention may, but do not necessarily, achieve one or more of the following advantages:

the ability to ergonomically and comfortably grip a media player;

provide an ergonomic control interface for a media player;

the ability for a user to control a media player using a single hand;

the ability for a user to control a media player using only their thumb;

the ability to provide select and scroll functions using only a user's thumb;

the ability to conveniently locate a media player within a motor vehicle;

the ability to locate a media player within a motor vehicle that minimizes interference with the vehicle's operation; and the ability to dock a media player in a docking station that can be removably located within a vehicle.

These and other advantages may be realized by reference to the remaining portions of the specification, claims, and abstract.

Brief Description of One Embodiment of the Present Invention

Aspects of the invention relate to ergonomic components of electronic devices, and in particular media players. In one aspect, there is provided a control button for a hand-held electronic device. The control button may include a first recess defining a first selectable zone, a second recess defining a second selectable zone and a third recess defining a third selectable zone. The third recess may be located between the first recess and the second recess and may extend perpendicularly from a line between the first recess and the second recess. The third recess may provide a scrolling selectable zone.

In one aspect, there is provided a media player comprising a housing. A contoured finger zone may be provided by a lateral groove in the housing. A user input device, for example the above described control button, may be located on the housing such that when a user's finger engages the lateral groove, the user's thumb is located adjacent one or more buttons or one or more slider zones.

The media player may be provided with a docking station for a media player that is adapted for use in a motor vehicle. The docking station may comprise a cylindrical body portion dimensioned to fit within a cup holder of a motor vehicle. The cylindrical body portion may have a substantially circular perimeter. The media player may be received within a recess of the cylindrical body portion such that the media player does not extend substantially radially outward of the circular perimeter.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF CERTAIN EMBODIMENTS OF THE PRESENT INVENTION

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

Figure 1:
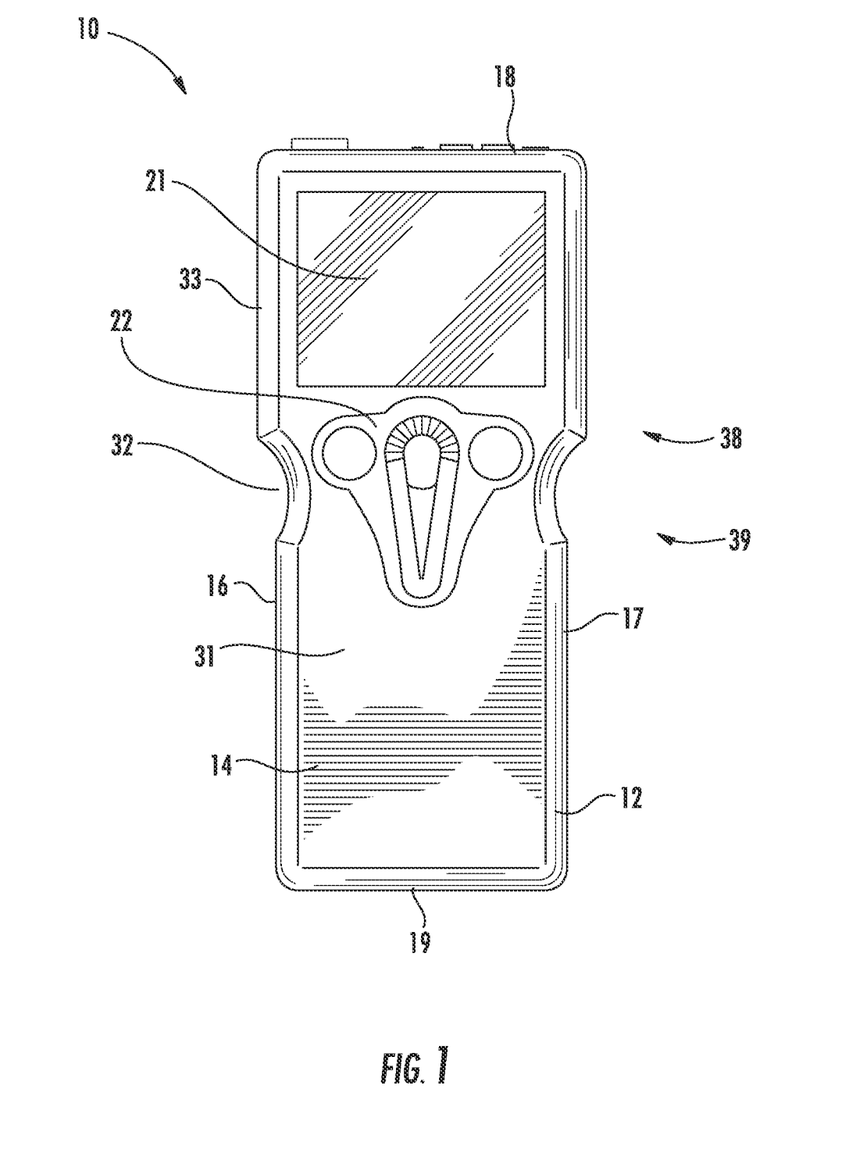
FIG. 1 is substantially a front view of one embodiment of a media player.

In FIG. 1, there is shown a media player 10. The media player 10 will be described using positional terms such as front, back, left, right, lateral, vertical, horizontal etc. These positional terms are used with reference to the depictions of the invention in the figures and in no way are intended to limit the scope of the invention as defined by the claims that follow.

The media player 10 includes a housing 12 having front surface 14, back surface 15, left and right sides 16, 17 and top and bottom sides 18, 19.

The front surface 14 includes a display screen 21 and an ergonomic user interface 22 that will be described in more detail below. The display screen 21 may be an LCD display screen with associated graphics processor and graphics memory.

Figure 2:
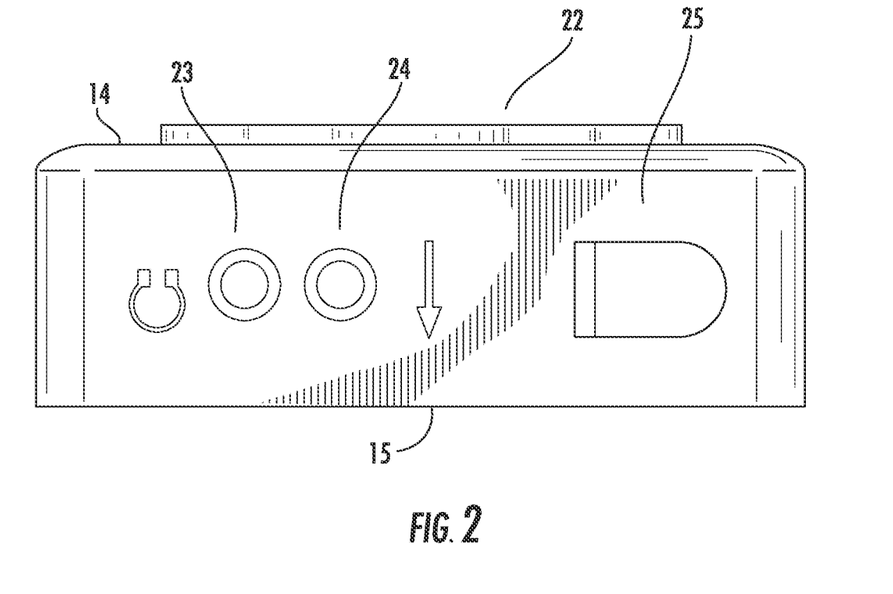
FIG. 2 is substantially a top view of the media player of FIG. 1.
Figure 3:
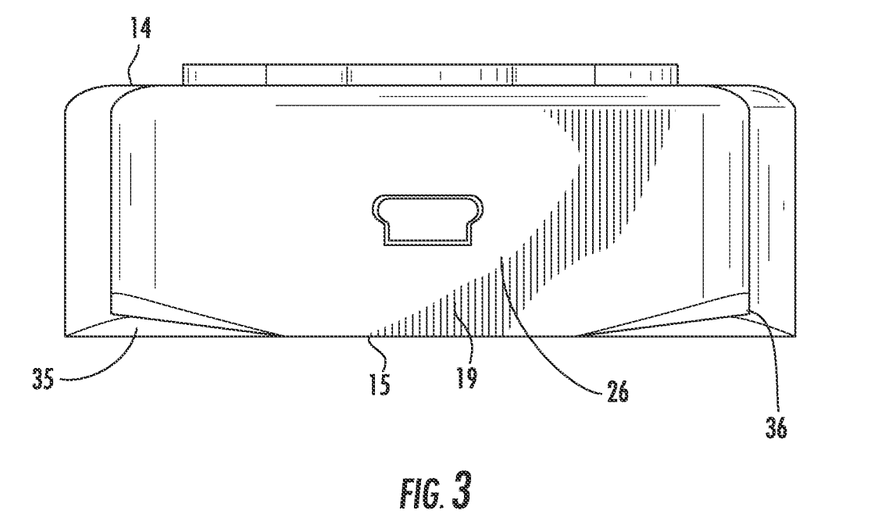
FIG. 3 is substantially a bottom view of the media player of FIG. 1.

The top side 18 is shown in more detail in FIG. 2 and includes speaker outputs 23, line out jack 24 and power switch and interface lock 25. The bottom side 19 is shown in more detail in FIG. 3 and includes a serial line output, such as a USB jack 26, which may be used for data and power transfer. Other arrangements of these connections may be made without departing from the scope of the invention as defined by the claims.

The present invention relates generally to the configuration of the housing and ergonomic aspects thereof. The specific electronic aspects of the media player are not considered pertinent for all embodiments. The media player will typically include circuitry within the housing 12 for receiving, storing and processing media files, rendering images on the display screen 21 and outputting audio signals to a speaker output 23 and/or other output ports and devices. The circuitry may also include circuitry for responding to control signals made through the user input device 22. Such circuitry is considered to be known by a person skilled in the art and thus no further description of the media player circuitry is considered to be necessary for an understanding of the present invention.

The media player may be configured to play media files in a proprietary format or in a multiple of available proprietary and non-proprietary formats. Media files that may be used by the device 10 may include music files, image files, movie files, text files, and any other similar media file that will be apparent to a person skilled in the art. In one embodiment, the media player 10 uses FLAC (Free Lossless Audio Codec) as its primary digital audio format, but also implements WAV, AIFF, MP3, AAC, OGG Vorbis, Apple Lossless and other audio codecs as well. The media player may use audiophile quality analog audio components as well as an audiophile quality DAC (Digital to Analog Converter) such as the Wolfson Microelectronics WM8986. The digital audio converter may allow for 6-channel surround output, a stereo line level output, and an amplified headphone output. Memory for media storage may include hard disk drive technology (such as Samsung Spinpoint HS161JQ 160 GB 4.2K 1.8" CE-ATA iPod Hard Disk), MicroSD or other card storage technology, or solid-state memory. The media player has a stereo headphone analog 3.5 mm output 23, a stereo line-level analog 3.5 mm output 24 and a 5.1 Surround (6-Channel) digital output via a mini USB jack 26 (or other serial connection) on the bottom face of the device.

Dimensions shown in the figures are intended to highlight the ergonomic design of the media player that facilitates easy use by the user. However, these dimensions are provided by way of example only and are not intended to be limiting on the scope of the invention as defined by the claims that follow.

Figure 4:
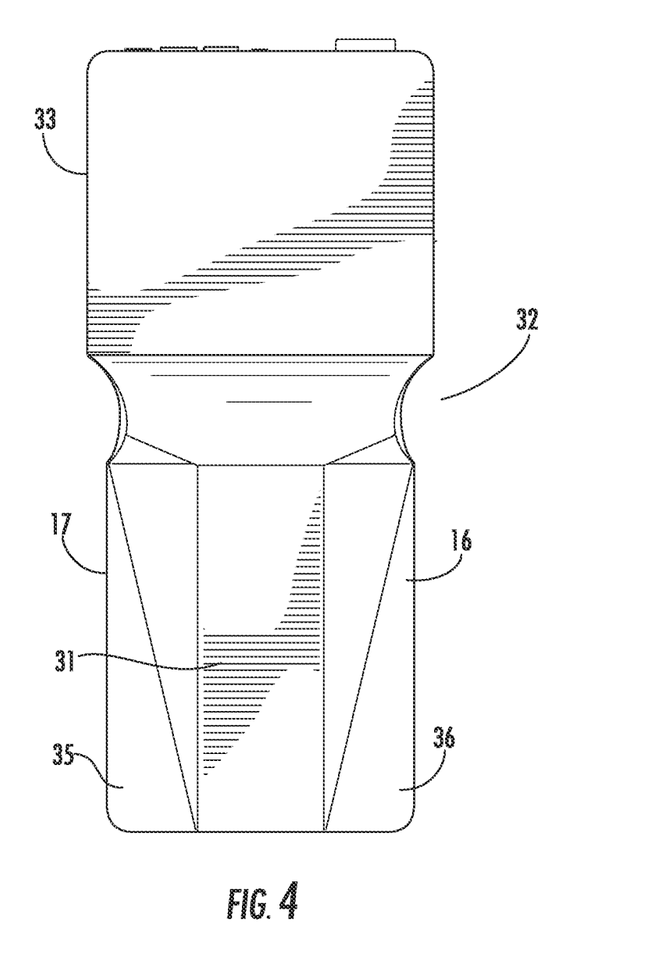
FIG. 4 is substantially a back view of the media player of FIG. 1.
Figure 10:
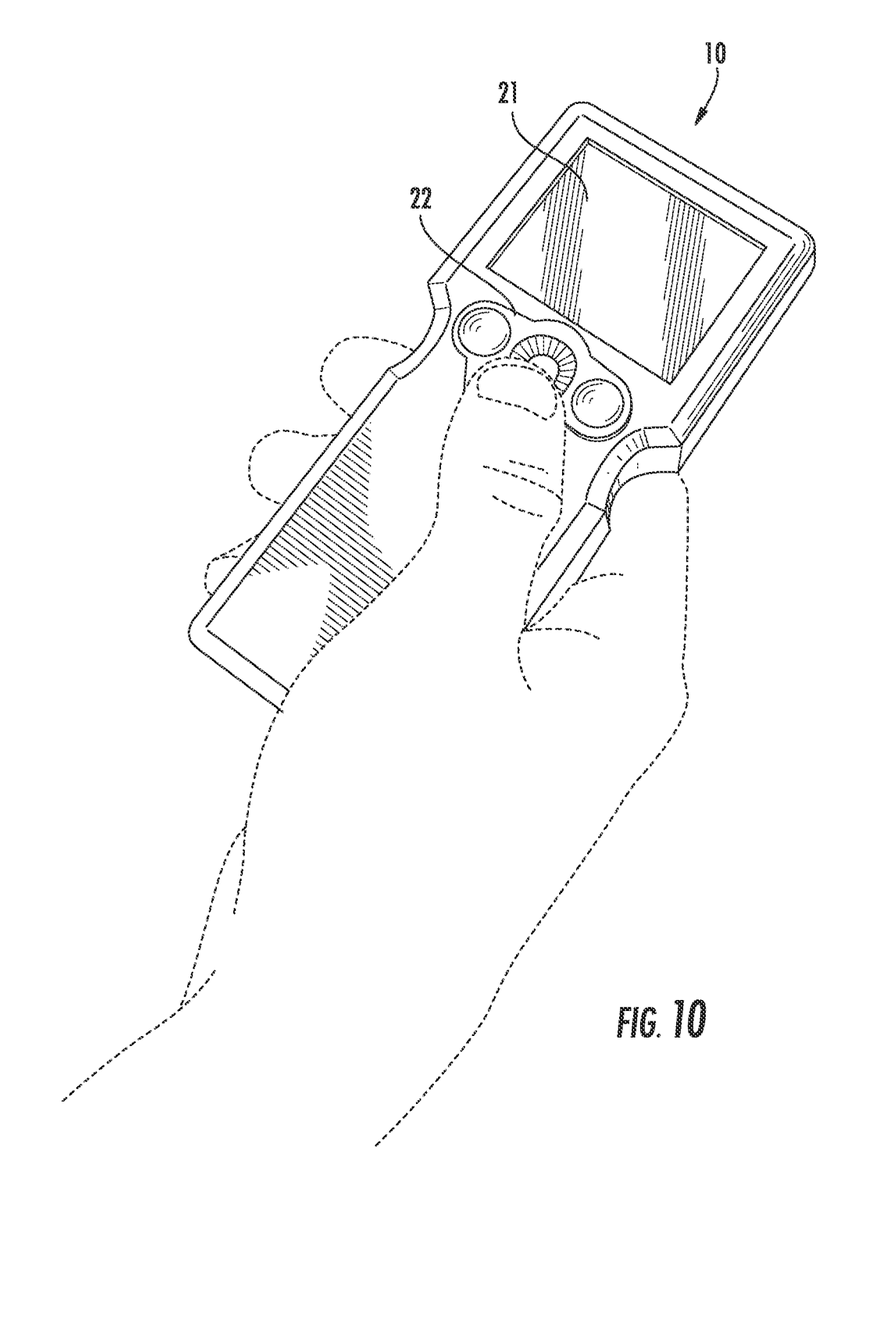
FIG. 10 is substantially a perspective view showing the media player held by a user.

The left and right sides 16, 17 and back surface 15 include ergonomic grip features that will be described in more detail below. The ergonomics of the device are intended to allow the user to easily control the features of the media player with a single hand with the thumb being the most important digit. As shown in FIG. 1, the left and right sides 16, 17 of the housing 12 include a lateral groove 32 that provides a lateral finger contour that extends across the back surface 15 of the housing 12, as shown in FIG. 4. As seen in FIG. 10, the groove 32 is shaped to receive a finger, typically the forefinger, of the user. The lateral groove 32 may be rounded to contour to the shape of the user's finger. In one embodiment, the groove 32 is between ½ inch to ¾ inch wide so that the groove 32 neatly receives the user's forefinger. In one specific embodiment, the finger contour is approximately ⅝ inch wide. The user's remaining fingers wrap around the lower handle section 31 of the housing 12. The provision of the groove 32 divides the housing 12 into a screen portion 33 that houses the screen 21 and a handle portion 31. The groove 32 also serves to locate the device 10 within the player's grip so that the user's forefinger naturally engages the groove 32, which has the consequence that the user's thumb is naturally located adjacent the user input device 22.

The handle section 31 may be narrower than the upper display screen section 33 of the housing. This arrangement further aids to locate the user's forefinger in the finger contour 32 of the housing 12. However, the size of the upper section 32 may be made to suit the specific display screen 21 utilized with the device.

The rear surface 15 of the housing 12, shown in more detail in FIG. 4, may be provided with beveled surfaces 35, 36 at the lower corners that further match the natural contours of a user's hand. The edges of the lower handle section 31 of the housing 12 may be beveled, curved or otherwise shaped to enhance the comfort and feel for the user. Example dimensions for the grip features are provided in FIGS. 3 and 4. Additional grip features may also be provided. In this regard, the housing may be made ambidextrous, i.e. suitable for gripping by either hand, or it may be provided in left and right handed models.

A specific, non-limiting, example of the media player will now be described. At its maximum width, the media player may be 2", at maximum length it may be 4.5", and the unit may be 0.6875" in thickness. The body may be composed of two rectilinear sections, the screen section (2" wide, 1.75" long) and the body section (2.125" long, 1.75" wide), which could be joined by an ergonomically curved grip of 0.6". All of these sections may feature rounded edges. The top most plane of the device may feature a 3.5 mm amplified headphone output, a 3.5 mm line level output, and a power/UI lock sliding button. The bottom plane of the device may feature a centered USB mini-B 2.0 connection (or other serial connector) for device interconnection (or possibly the other physical connections discussed earlier). The button on the front face of the player may serve as the only user interface and it may be controlled by the thumb while the player is in the hand.

The media player 10 may utilize a wireless broadband connection, a WiFi connection or a physical digital serial connection (e.g. USB 2.0 or 3.0) to transfer digital music to its onboard memory and to purchase new media. These digital audio files may be organized and accessed through any appropriate operating system and playback software, of which a specific proprietary example will be described in detail below. The graphic user interface of the software may be displayed on the screen 21 at the front of the player.

The media player may further include a rechargeable battery capable of powering all components continuously for a required time, e.g. 12 hours. The media player 10 may further include a broadband adapter (e.g. G3 or G4) and a storage media with, for example, 160 GB of storage. The storage media may take the form of a 1.8" hard disk, a form of memory card (e.g. MicroSD) or a solid-state memory component.

The media player may be configured to be controlled through its user input device 22, a personal computer while the Player is wirelessly or physically connected to the computer, or another device, like a car audio system or home theater center.

The user input device 22 will now be described in more detail with reference to FIGS. 5 and 6. The user input device 22 includes a button 50 designed to be controlled with the thumb of the hand holding the device, thus allowing for ergonomic, one-handed operation. The button 50 includes three clickable indented button zones. A left button zone 51, a central button zone 52 and a right button zone 53. The indented zone of the central button zone 52 extends downwards to a tail point 55 to form a continuous slider 54 zone. Each of the button zones 51, 52, 53 is clickable, much the way a mouse button is clickable. Each of the button zones may have three different interactions: single click, double click and click hold (continuous clicking). The tail 54 of the button 50 is fixed and serves as the main pivot point 55 for the three button zones 51, 52, 53. The head serves as a rocking pivot point 56 for clicks on the wings 51, 53 of the button, as shown most clearly in FIG. 6. Each of the button zones may be loaded with a spring (not shown) to provide resistance against the thumb.

Figure 5:
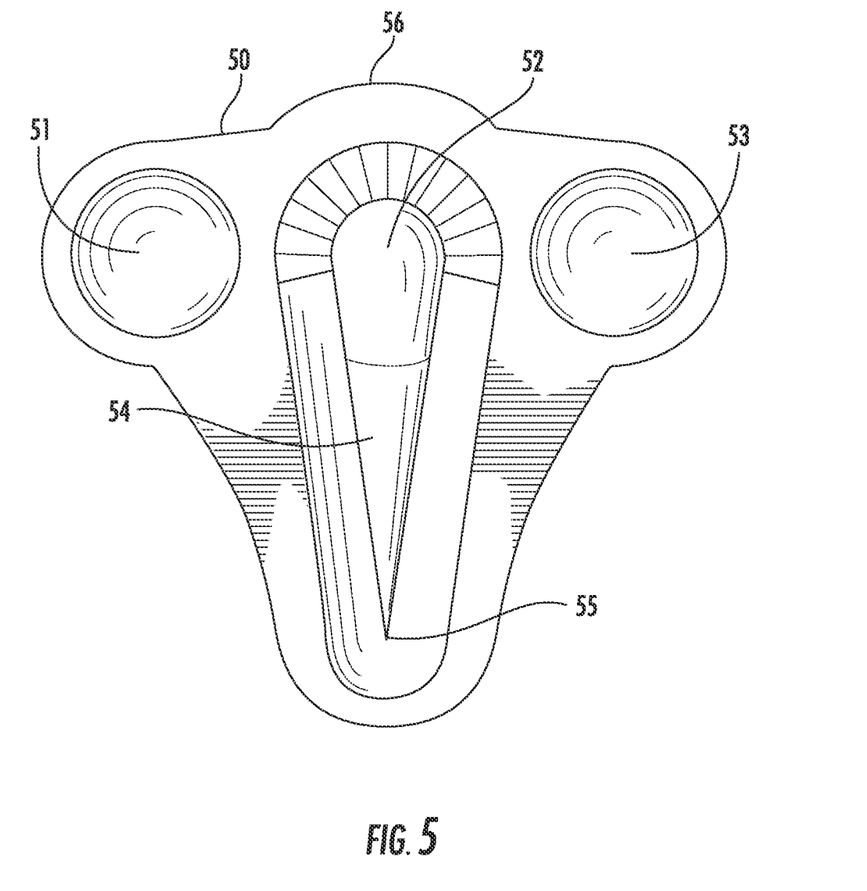
FIG. 5 is substantially a front view of a control button.
Figure 6:
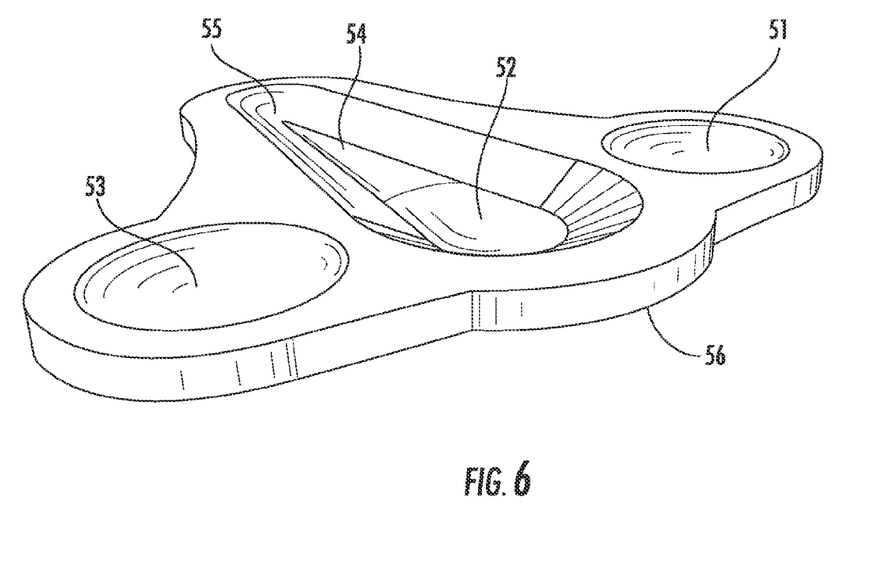
FIG. 6 is substantially a perspective view of the control button of FIG. 5.

As shown in FIGS. 5 and 6, the button 50 may be produced as a stand alone, single piece device using appropriate materials like anodized aluminum, which would be known to a person skilled in the art. The single piece construction has a head section (central button 52), two wings (left and right buttons 51, 53) and a tail (slider 54). Contacts for the button and slider functions may be provided beneath the button 50 on the media player and the button may be separated from the contacts via a series of springs. These springs allow side to side rocking motion for pressing left and right buttons 51, 53 and also allow a potential clicking motion of the center button 52. The slider function of the button 50 may be produced through variations in capacitance created by touching the length of the center thumb groove at various locations. The thumb slider groove will provide continuous data much in the way a ribbon controller on a MIDI instrument produces continuous data. The button 50 may be incorporated into any suitable media player in addition to the specific media player 10, with finger groove 32, described above with reference to FIGS. 1 to 4.

The button 50 is positioned on the front side 14 of the housing 12, between the screen 32 and body sections 31 of the device. The button 50 is flat with the three button zones 51, 52, 53 being indented for the user's thumb. As shown in FIG. 1, the button 50 may be located on the front surface 14 of the housing 12 so that the slider zone 54 extends across the finger contour zone marked by the lines 38, 39 that denote the width of the lateral groove 32. A notional line between the left button zone 51 and the right button zone 53 is disposed slightly higher, i.e., more toward the screen portion 33, than a lateral axis of the lateral groove such that the button zones 51, 52, 53 at least partially overlap with the finger contour zone. This configuration disposes the button zones 51, 52, 53 and slider zone 54 so that when the device 10 is gripped and the user's forefinger engages the lateral groove 32, the user's thumb is ergonomically placed adjacent the buttons 51, 52, 53 and adjacent the slider zone 54, thereby allowing the user's thumb to operate the buttons 51, 52, 53 and to be used as a sliding action on the slider zone 54.

The button zones 51, 52, 53 and slider zone 54 may be context sensitive and thus have different functions during different modalities of use in the software of the media player 10. For example, in a listening or playback mode, the slider function may control volume and the buttons may control track skipping, while in a media selection mode, the slider function may control scrolling of track title lists while the buttons control selections of the track from the lists.

In the figures, the button 50 is shown centered on the longitudinal axis (i.e. vertical axis as depicted in the FIG. 1). If the media player is produced in left and right handed models, the button 50 may be disposed off centre and at different orientations to enable a user to favor one hand over the other.

The button zones 51, 52, 53 are each depicted as being recessed or indented zones. However, the button zones may be delineated by other means such as raised areas, contoured areas, roughened areas, etc.

Figure 7:
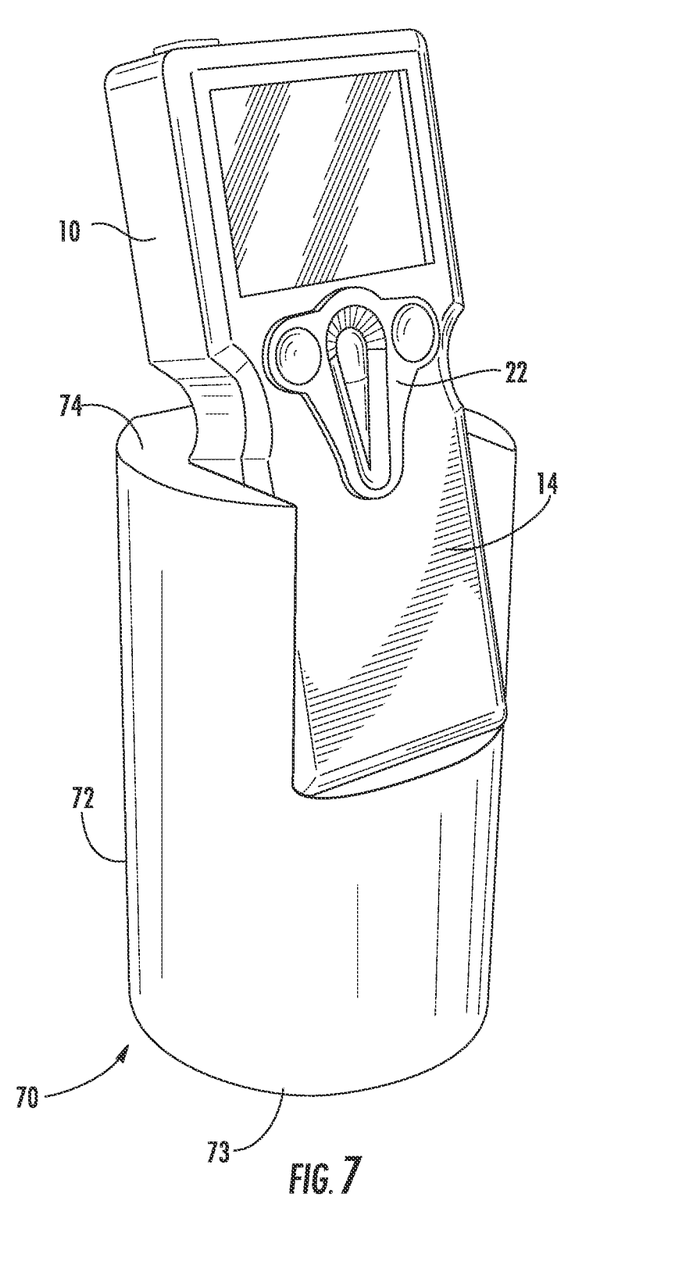
FIG. 7 is substantially a perspective view of a media player within a docking station.

The media player 10 may be provided with a docking station 70 as illustrated in FIG. 7. The docking station 70 is depicted in more detail in FIGS. 8 and 9. The docking station 70 allows the media player 10 to be integrated into existing car and home audio systems. The dock 70 includes a cylindrical housing 72 that is designed to fit within a standard US car cup holder without any overlap. The cylindrical housing may taper outwardly from the base 73 toward the top 74. The shape is such that it can fit in virtually any cup holder within a vehicle and does not interfere with operation of the vehicle. The dock 70 can also stand alone outside of a vehicle cup holder and so may be removed from the vehicle and used as a home entertainment station. The cylindrical housing 72 includes a recess 75 provided from the top 74 and into an outer surface of the housing 72. The media player 10 slides into the recess 75 from the top 74 with the front face 14 of the media player exposed, thereby allowing the user input device 22 to be manipulated by the user. When the media player 10 is received within the recess 75, the media player 10 does not extend radially outward of the cylindrical housing, thereby maintaining the compact nature of the docking station and media player and ensuring the any interference with the operation of the vehicle is minimized.

Figure 8:
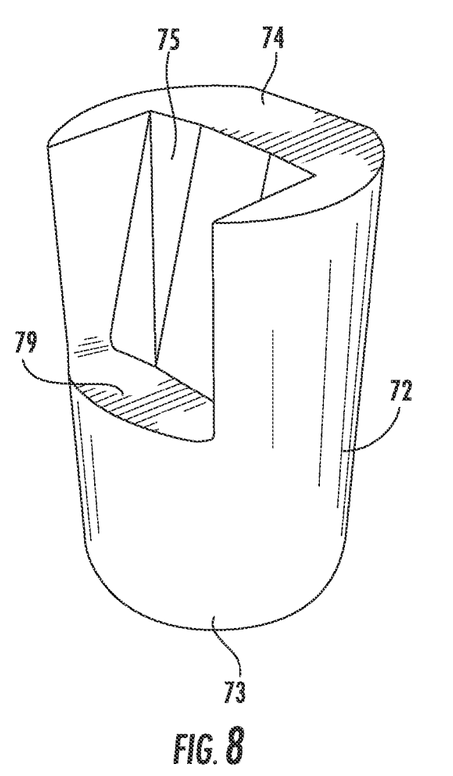
FIG. 8 is substantially a perspective view of the docking station showing a recess that receives the media player.
Figure 9:
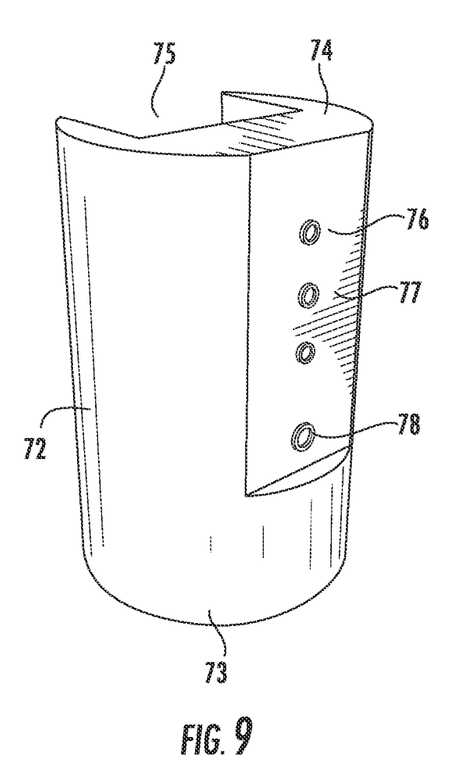
FIG. 9 is substantially a perspective view showing the rear surface of the docking station.

As the media player 10 slides into the recess 75, the media player's bottom-mounted USB mini-B connection 26 mates with the dock's integrated USB plug located in the bottom 79 of the recess 75. Placing the player 10 into the dock connects the USB connector. Through the USB connection, the battery of the media player 10 may be charged via a power connection 78 on the rear surface of the docking station 70. In addition, the USB connection can be used by the media player 10 to output a 6 channel digital audio stream via outlets 76, 77 in the docking station 70.

In one specific embodiment, the docking station is cylindrical in shape with a diameter of 1.75" and a height of 4." The recess allows the player 10 to sit into the cylinder at a 15 degree angle. Other dimensions may be used without departing from the scope of the invention as defined by the claims that follow.

When used in a vehicle, the docking station may have 5.1 Surround (6-Channel) analog outputs 76, 77 and a 12V input 78 that can be powered from the so-called cigarette-lighter power outlet in cars or via a 12 Volt AC to DC converter. Outside of the vehicle, the docking station may be connected to a mains power supply via a suitable transformer. Surround sound output may be available when the unit is docked in a home docking station, a car docking station, or in a car entertainment system.

A desktop software package may be provided for use with the media player that enables the user to initialize the device, add content, sort playlists and control licensing, as well as other functions. The purpose of the Desktop Software package is to provide a full interface to all of the functionality of the media player 10 with a full-size keyboard, display and hardware for importing hard media like CD, DVD and Blu-eray Media. The software will maintain the media library database and all of the license information about its contents. The Desktop Software will also serve as a full capability media player, encoder and hard media burning tool. The Desktop Software may be a plug-in or extension for the web browser or a cross-platform independent application. The Desktop Software may be constructed with Java or other platform independent programming language.

In one embodiment, the desktop software package may include a media and licensing database and media player software. Both the Media and Licensing Databases may be constructed using MySQL or similar database software. It is preferable, though not essential, to use the same type of database for the Desktop Software, Server Software and Player Software.

The media player software may play standard playlists like Winamp Playlist format, as well as proprietary Playlists. In addition, the media player software offers full transport control as well as media selection. In order to browse online stores for new media, a web browser may be tightly integrated with the desktop software. A player's settings and options may be configured from the Desktop Software.

A playlist editor may be provided as a component of the desktop software. The playlist editor allows content creators and users to make and edit playlists of their digital media files. The tool may be used with a consumer oriented software package or with a mastering suite package targeted at professional audio engineers. A playlist may be a text-based file in XML format analogous to a PQ sheet used by CD mastering software. It may detail a list of media files, with an order for play and control over the time in between songs. Similar to the indexing uses in Digital Audio Tape, the playlist may include the following types of indexes:

1. Track Begin
2. Track End
3. Skip to Next Track Begin
4. Silence Begin
5. Silence End Playlists may be composed on one or more Media Files and one or more Track Begin/Track End pairs. A single media file may have many named tracks within the playlist, or a playlist could be constructed with many media files each with a single named track. This would provide content creators with the maximum amount of flexibility in crafting the art object. An example of a playlist might look like the following:

```
<media>
    <file>
        <path>/foldername/foldername/filename.flac</path>
        <name>Real Text Name of Selection</name>
        <meta>/foldername/foldername/metadatafilename.meta</meta>
        <samplerate>Sample Rate in Hertz</samplerate>
        <bitdepth>Number of Bits Per Sample</bitdepth>
        <start>Sample To Start On</start>
        <track>/foldername/foldername/metadatafilename.meta</track>
        <stop>Sample to End On</stop>
        <skip>Samples to Skip</skip>
```

-continued

```
        <start>Sample To Start On</start>
        <track>/foldername/foldername/metadatafilename.meta</track>
        <stop>Sample to End On</stop>
        <skip>Samples to Skip</skip>
        <silence>Samples of Silence</silence>
        <start>Sample To Start On</start>
        <track>/foldername/foldername/metadatafilename.meta</track>
        <stop>Sample to End On</stop>
        <skip>Samples to Skip</skip>
    </file>
    <file>
        <path>/foldername/foldername/filename.flac</path>
        <name>Real Text Name of Selection</name>
        <meta>/foldername/foldername/metadatafilename.meta</meta>
        <start>Sample To Start On</start>
        <track>/foldername/foldername/metadatafilename.meta</track>
        <stop>Sample to End On</stop>
    </file>
</media>
```

The player Software may be hosted on a mobile version of standard operating systems, such as Linux Mobile or Windows Mobile. The on-board database may be the MySQL Lite or a similar small-footprint database. Player software may consist of media player components, search and browse features, and a way of purchasing media from the player itself.

The player's functions may be controlled remotely via a wireless Ethernet connection, a Bluetooth connection or some other wireless connection from home or automotive audio systems. This would for instance allow a car audio system to control playback, search and transport functions from the in-dash audio system of an automobile.

Users of the music system will sign up to receive a globally unique ID (GUID). The GUID will be used to keep track of user's individual media licenses and will be used in the generation of a License ID. The GUID and the ISRC codes of songs will be used together in the algorithm to generate a unique combined license code for each user. When a user purchases media, the media file will be tagged with the License ID, which is a combination of the ISRC and the User's GUID.

If the user already has purchased digital media from sources other than the proprietary music system, this media can be played without restriction. When a user owns a physical CD and rips a digital copy for play on the SAVOR, the software will generate a license automatically from the ISRC codes on the physical media. The attachment of such information to the song allows record labels to track copies of each piece of media and attribute those copies to a specific user (while still keeping the personal information of these users private).

The process of purchase and delivery of media files to the system may tag the User's GUID (Globally Unique ID) to the FLAC file itself for honor-based file protection scheme. When consumers "buy" content, they are actually making a copy of a downloadable file that they have a license to play, to copy for personal use and to fix onto whatever media they choose. For instance, a consumer could purchase a 5.1 Surround High Definition version of a music recording and then make a DVD-A copy of that work, copy the file to their media player and store the file on their PC. While it would violate their license agreement, the consumer could even digitally transmit the audio file to a friend to listen to over email. There may be a provision for consumers to buy a license for a media file that they have been sent by a different consumer. This would help to study and track viral distribution methods.

In an honor based digital rights management system, consumers digitally sign a license agreement stating that that will not distribute the file to other consumers and that they will not strip the license meta-data from their media files. When the purchase of content is made, a unique code is generated and attached to the media file based on the user's GUID and the ISRC code for the media. This is the license number associating the consumer with the media they have purchased. If the license number is removed, the media is no longer a lawful copy of the media. When a consumer purchases "hard-media" like CDs or DVDs, the consumer can make a digital copy of the material that will automatically get a License ID associating their Consumer ID with the media's ISRC Code.

For users that create content, i.e. when a person or a company creates new media, they allocate ISRC codes for the individual pieces of media in the exact same way that they do now for CDs. Next, the Content Creators upload the master copies of their digital files in whatever format they choose to release the material in to the Media Server(s) and enter the ISRC Code, the retail price, and other information such as release date, playlists that include the media, etc. Content creators can create masters and playlists with the Playlist Editor/Digital File Mastering Tool which is part of the Desktop Software package.

When a consumer first wants to purchase the above described media player, or purchase approved media, they are assigned a Globally Unique ID (GUID). One GUID can be associated with many players and storage units, but a consumer can only have one GUID. For consumers who do not want to own hardware, a software-only version may be available.

Other than a Nag-ware feature built into the Desktop and Player Software, the license is protected with honesty and convenience. When consumers purchase a player or download the Desktop Software they may be required to digitally sign an agreement declaring that they will not violate copyright law. If it seems as if a consumer has a great deal of unlicensed full-quality media that they have not obtained through hard-copy import or the consumer is under suspicion of pirating copyrighted material an audit of the user's Player and Desktop Software may be performed. The audit would clearly show which media has no license and would provide the opportunity for the user to purchase licenses for the media or risk prosecution.

The media player and Desktop Software may be configured to play licensed and unlicensed files of all types including but not limited to: FLAC, MP3, AAC, Ogg Vorbis, WMA, Apple Lossless, WAV, AIFF, Broadcast Wave, DECE Audio, DTS Surround, DTS-HD, Dolby TrueHD, Fraunhofer IIS MPEG Surround and others. For any unlicensed media, the desktop and player software may prompt with the number of unlicensed or un-grandfathered files each time the device is powered up. It will provide an option to license or delete the files.

When a consumer purchases a CD or DVD or other hard media, the media can be imported to a PC or to the SAVOR player directly. The Savor PC software will obtain a License ID based on the ISRC and the Consumer ID. The system will assume that material on hard media is a valid legal hard-media purchase assuming the media is the same as the legal version. Digital file media pirates would be very unlikely to make a hard copy of a hard media selection, and the data would likely not be an exact copy if the files were ripped to a lossy format first and then burned to hard media.

Many users may create their own media to play on their Player or in their Desktop Software. This audio would be considered un-published audio and would not be subject to commercial music licensing. Content Creators could create their own licenses for the media they create.

One or more media servers may be provided to support the desktop and player software. The media servers may house the actual media files for download to the players or desktops. As describe above, the media files may be FLAC or any other suitable media format. The media server may also provide a customer GUID Database. This database would associate a GUID with a Customer, keep track Address, Email, Customer Relationship Management and store permissions and family relationships. The media server may also include a License Database that associates a GUID with an ISRC code for the media track and create and store a Combined Unique ID with ISRC and a Customer GUID.

Although the description above contains many specifications, these should not be construed as limiting the scope of the invention but as merely providing illustrations of some of the embodiments of this invention. Thus, the scope of the invention should be determined by the appended claims and their legal equivalents rather than by the examples given.

What is claimed is:

1. A media player comprising:
    (A) a housing comprising a back surface comprising a substantially flat portion, a lateral groove formed as a recess in the flat portion of the back surface, the lateral groove extending from a first side of the housing to a second side of the housing across the back side of the housing, the lateral groove providing a contoured finger zone;
    (B) a user input device located on the housing, the user input device comprising a control button, the control button comprising:
        (a) a first recess defining a first selectable zone;
        (b) a second recess defining a second selectable zone;
        (c) a third recess defining a third selectable zone;
        (d) wherein the first recess, second recess and third recess are all components of a single button;
        (e) wherein the third recess is located between the first recess and the second recess;
        (e) wherein the third recess extends perpendicularly from a line between the first recess and the second recess; and
        (f) wherein the third recess provides a scrolling selectable zone
    (C) wherein the user input device is disposed on the housing so that when a user's finger engages the lateral groove, the user's thumb is located adjacent at least one of the first selectable zone, second selectable zone or third selectable zone.

2. The media player of claim 1 wherein the lateral groove is between ½ inch and ¾ inch wide such that it receives one finger of a user.

3. The media player of claim 1 wherein the lateral groove divides the housing into a handle portion and a screen portion, wherein the screen portion comprises a display screen in a front surface of the housing and wherein a width of the handle portion across the front surface is narrower than a width of the screen portion.

4. The media player of claim 3 wherein the user input device comprises:
    (A) a first button zone and a second button zone, a line between the first button zone and the second button zone being substantially parallel to the lateral groove;
    (B) wherein the user input device is disposed on the housing such that the line between the left button zone and the right button zone is closer to the screen portion than a lateral axis of the lateral groove.

5. The media player of claim 1 wherein the user input device is disposed on the housing such that at least a portion of the one or more button zones overlaps with the contoured finger zone provided by the lateral groove.

6. The media player of claim 1 wherein the user input device comprises:
   (A) a left button zone;
   (B) a right button zone; and
   (C) a slider zone between the left button zone and the right button zone, the slider zone extending perpendicular to a line between the left button zone and the right button zone.

7. The media player of claim 6 wherein the slider zone extends to a base, the base comprising an anchor pivot point for the left button zone and the right button zone.

8. The media player of claim 7 wherein the user input device comprises a head between the left button zone and the right button zone, the head comprising a rocking pivot point for the left button zone and the right button zone.

9. The media player of claim 8 wherein the user input device comprises a central button zone located between the left button zone and the right button zone.

10. The media player of claim 9 wherein the slider zone extends from the central button zone to the anchor pivot point.

11. The media player of claim 6 wherein the left button zone, the right button zone and the slide zone each comprise indented regions of the user input device.

\* \* \* \* \*